(12) United States Patent
Aoki et al.

(10) Patent No.: US 11,078,858 B2
(45) Date of Patent: Aug. 3, 2021

(54) CONTROL APPARATUS FOR AN INTERNAL COMBUSTION ENGINE

(71) Applicant: TOYOTA JIDOSHA KABUSHIKI KAISHA, Aichi-ken (JP)

(72) Inventors: Keiichiro Aoki, Shizuoka-ken (JP); Kazuki Takahashi, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/273,160

(22) Filed: Feb. 12, 2019

(65) Prior Publication Data

US 2019/0249616 A1 Aug. 15, 2019

(30) Foreign Application Priority Data

Feb. 13, 2018 (JP) .............................. JP2018-023082

(51) Int. Cl.
*G06G 7/70* (2006.01)
*F02D 41/14* (2006.01)
(Continued)

(52) U.S. Cl.
CPC ........ *F02D 41/1494* (2013.01); *F01N 11/002* (2013.01); *F02D 41/1445* (2013.01); *F02D 41/1456* (2013.01); *F02D 41/2474* (2013.01); *F02D 41/062* (2013.01); *F02D 41/2441* (2013.01); *G01N 27/4067* (2013.01)

(58) Field of Classification Search
CPC ............... F02D 41/064; F02D 35/0015; F02D 41/1494; F02D 2250/24; B60W 20/16; B60W 10/08; B60W 2510/068; G01N 27/4118; B60K 6/445
See application file for complete search history.

(56) References Cited

U.S. PATENT DOCUMENTS 4,359,030 A * 11/1982 Sone .................... F02D 41/1494
123/697
4,655,182 A * 4/1987 Nakano ............... F02D 41/1494
123/179.1

(Continued)

FOREIGN PATENT DOCUMENTS

JP H9-329575 A 12/1997
JP 2003148206 * 5/2003 ......... F02D 41/1494

(Continued)

*Primary Examiner* — Hung Q Nguyen
*Assistant Examiner* — Anthony Donald Taylor, Jr.
(74) *Attorney, Agent, or Firm* — Hauptman Ham, LLP

(57) ABSTRACT

A control apparatus for an internal combustion engine includes an exhaust gas sensor that has a sensor element and a heater for electrically heating the sensor element, a sensor circuit that detects the electric current generated by the exhaust gas sensor, a controller configured to: carry out starting processing to start the internal combustion engine, learn a value of the output of the sensor circuit when the starting processing is carried out by the controller, and control a temperature of the sensor element by using the heater, and controls the temperature of the sensor element to less than the predetermined temperature until the learning of the output value of the sensor circuit by the controller is completed after the starting processing is carried out by the controller.

3 Claims, 7 Drawing Sheets

(51) Int. Cl.
  *F01N 11/00* (2006.01)
  *F02D 41/24* (2006.01)
  *G01N 27/406* (2006.01)
  *F02D 41/06* (2006.01)

(56) References Cited

U.S. PATENT DOCUMENTS

| | | | | |
|---|---|---|---|---|
| 4,721,088 A * | 1/1988 | Mieno | F02D 41/1494 |
| | | | | 123/686 |
| 4,938,196 A * | 7/1990 | Hoshi | F02D 41/1494 |
| | | | | 123/697 |
| 4,993,392 A * | 2/1991 | Tanaka | F02D 41/1494 |
| | | | | 123/697 |
| 5,111,792 A * | 5/1992 | Nagai | G01N 27/4067 |
| | | | | 123/685 |
| 5,148,795 A * | 9/1992 | Nagai | F02D 41/1494 |
| | | | | 123/697 |
| 5,214,267 A * | 5/1993 | Hoshi | F02D 41/1494 |
| | | | | 219/494 |
| 5,473,889 A * | 12/1995 | Ehar | F02D 41/1441 |
| | | | | 60/276 |
| 5,588,417 A * | 12/1996 | Kotwicki | F02D 41/1494 |
| | | | | 123/697 |
| 5,656,190 A * | 8/1997 | Aoki | F02D 41/1494 |
| | | | | 219/497 |
| 5,696,313 A * | 12/1997 | Hafele | G01N 27/4067 |
| | | | | 73/23.31 |
| 5,700,367 A * | 12/1997 | Yamada | F02D 41/1494 |
| | | | | 205/785 |
| 5,701,877 A * | 12/1997 | Aoki | F02D 41/1494 |
| | | | | 123/697 |
| 5,719,778 A * | 2/1998 | Suzumura | G01N 27/4067 |
| | | | | 700/207 |
| 5,731,570 A * | 3/1998 | Aoki | F02D 41/1494 |
| | | | | 123/697 |
| 5,752,493 A * | 5/1998 | Abe | G01N 27/4067 |
| | | | | 123/686 |
| 5,834,624 A * | 11/1998 | Nakagawa | F02D 41/068 |
| | | | | 73/23.32 |
| 5,836,292 A * | 11/1998 | Aoki | F02D 41/123 |
| | | | | 123/697 |
| 5,967,129 A * | 10/1999 | Yamashita | F02D 41/1495 |
| | | | | 123/674 |
| 6,082,345 A * | 7/2000 | Ikeuchi | F02D 41/1495 |
| | | | | 123/688 |
| 6,258,232 B1 * | 7/2001 | Hasegawa | F02D 41/1494 |
| | | | | 204/424 |
| 6,304,813 B1 * | 10/2001 | Ikeda | F02D 41/1494 |
| | | | | 123/697 |
| 6,384,386 B2 * | 5/2002 | Hashimoto | G01N 27/122 |
| | | | | 123/697 |
| 6,476,364 B1 * | 11/2002 | Shimamura | G01N 27/4067 |
| | | | | 123/697 |
| 6,586,711 B2 * | 7/2003 | Whitney | G01N 27/4067 |
| | | | | 219/497 |
| 6,679,238 B2 * | 1/2004 | Nebiyeloul-Kifle | |
| | | | | F02D 41/1494 |
| | | | | 123/676 |
| 6,696,673 B2 * | 2/2004 | Okamoto | F02D 41/1494 |
| | | | | 123/697 |
| 6,720,534 B2 * | 4/2004 | Hada | G01N 27/4067 |
| | | | | 219/494 |
| 6,812,436 B2 * | 11/2004 | Nomura | G01N 27/4067 |
| | | | | 219/202 |
| 6,935,101 B2 * | 8/2005 | Morinaga | G01N 27/4067 |
| | | | | 123/685 |
| 7,084,379 B2 * | 8/2006 | Saito | F02D 41/1494 |
| | | | | 123/697 |
| 2008/0277281 A1 * | 11/2008 | Hiraiwa | G01N 27/4067 |
| | | | | 204/406 |
| 2010/0132680 A1 * | 6/2010 | Iwahashi | F02D 41/1494 |
| | | | | 123/697 |
| 2011/0132775 A1 * | 6/2011 | Kawai | F02D 41/146 |
| | | | | 205/784 |
| 2013/0006499 A1 * | 1/2013 | Date | F02D 41/042 |
| | | | | 701/104 |
| 2014/0346041 A1 * | 11/2014 | Nishijima | F02D 41/1494 |
| | | | | 204/408 |
| 2015/0293053 A1 * | 10/2015 | Akiyama | G01N 27/419 |
| | | | | 204/408 |
| 2018/0274469 A1 * | 9/2018 | Glugla | F02D 41/1494 |

FOREIGN PATENT DOCUMENTS

| | | | | |
|---|---|---|---|---|
| JP | 2007120390 | * | 5/2007 | F02D 41/1494 |
| JP | 2010014562 | * | 1/2010 | G01N 27/26 |
| JP | 2011007145 | * | 1/2011 | Y02T 10/47 |

* cited by examiner

CONTROL APPARATUS FOR AN INTERNAL COMBUSTION ENGINE

CROSS REFERENCE TO RELATED APPLICATION

This application claims the benefit of Japanese Patent Application No. 2018-023082, filed on Feb. 13, 2018, which is hereby incorporated by reference herein in its entirety.

BACKGROUND

Technical Field

The present disclosure relates to a control apparatus for an internal combustion engine.

Description of the Related Art

Some of exhaust gas sensors for detecting components contained in exhaust gas of an internal combustion engine are each provided with a sensor element for generating electric current, and a heater for heating the sensor element. In such exhaust gas sensors, the detection accuracy thereof can be maintained by heating the sensor element by means of the heater.

In addition, in patent literature 1, there is disclosed a technique that determines, based on a cooling water temperature of an internal combustion engine, whether an air fuel ratio sensor is in an inactive state, and corrects an error in an output value of an air fuel ratio sensor circuit when the air fuel ratio sensor is in the inactive state.

CITATION LIST

Patent Literature

Patent Literature 1: Japanese patent application laid-open publication No. H9-329575

SUMMARY

Technical Problem

In a sensor circuit that produces an output corresponding to an electric current generated by an exhaust gas sensor, an output error may occur due to an individual difference, a change over time, etc., of the circuit. Accordingly, in order to make the detection accuracy of the sensor as high as possible, it is necessary to correct the output error of such a sensor circuit. Here, according to the conventional technique which corrects the output error of the sensor circuit when the air fuel ratio sensor is in the inactive state, the influence of the electric current generated by the air fuel ratio sensor can be eliminated, so that the output error of the sensor circuit can be corrected. For that reason, it seems that the output error of the sensor circuit is corrected with relatively high accuracy, thus making it possible to maintain the detection accuracy of the sensor as high as possible.

Here, when the exhaust gas sensor is in a cold state at the time of starting of the internal combustion engine, and warming up of the exhaust gas sensor is carried out by the heater. In addition, at the time of starting of the internal combustion engine, learning of the output value of the sensor circuit is carried out, so that the output error of the sensor circuit is corrected based on a learning value thus obtained. On the other hand, in the conventional technique, temperature control of the sensor element using the heater is not taken into consideration. Accordingly, even if the output error of the sensor circuit is tried to be corrected based on the conventional technique, there is a fear that in cases where the warming up of the exhaust gas sensor with the heater is completed at an early stage, the correction will not be able to be carried out. This is because a period of time in which the exhaust gas sensor is in the inactive state is very short, so the opportunity of learning the output value of the sensor circuit at the time of starting of the internal combustion engine can be lost.

The present disclosure has been made in view of the above-mentioned problems, and has for its object to provide a technique capable of obtaining an opportunity for learning an output value of a sensor circuit at the time of starting of an internal combustion engine in an appropriate manner.

Solution to Problem

A control apparatus for an internal combustion engine according to the present disclosure comprises: an exhaust gas sensor that has a sensor element arranged in an exhaust passage of the internal combustion engine for generating electric current when it becomes equal to or higher than a predetermined temperature, and a heater for electrically heating said sensor element; a sensor circuit configured to detect the electric current generated by said exhaust gas sensor, and produces an output corresponding to said electric current; a controller configured to: carry out starting processing to start said internal combustion engine; and learn a value of the output of said sensor circuit when said starting processing is carried out by said controller.

In said exhaust gas sensor, the sensor element is electrically heated by the heater. Then, when a temperature of the sensor element becomes equal to or higher than the predetermined temperature, electric current is generated. For example, in cases where the exhaust gas sensor is a sensor that generates an electric current corresponding to a concentration of oxygen in the exhaust gas, the sensor element has a solid electrolyte between a pair of electrodes, wherein when the temperature of the solid electrolyte becomes equal to or higher than the predetermined temperature, oxygen ions become conductive in the solid electrolyte. When the oxygen ions conduct in the solid electrolyte, electric current will flow in the sensor element. Then, when the exhaust gas sensor generates electric current, the sensor circuit produces the output corresponding to the electric current.

In addition, the controller carries out starting processing of the internal combustion engine. Here, the starting processing is processing to start the internal combustion engine of which the operation has been stopped, and is, for example, processing to turn ignition on, or turn on the operation of a starter. Then, when the starting processing is carried out, the controller learns the output value of the sensor circuit. In that case, it becomes possible to correct an output error of the sensor circuit by using the output value of the sensor circuit which has been learned.

On the other hand, the sensor element can be made to an active or activated state as early as possible so that warming up of the exhaust gas sensor at the time of starting of the internal combustion engine can be completed as early as possible. Here, note that the active or activated state of the sensor element means a state where the sensor element is made equal to or higher than an activation temperature. With this, the exhaust gas sensor generates electric current from immediately after the starting of the internal combustion engine, and when the sensor element becomes equal to or higher than the activation temperature, it becomes possible to detect components contained in the exhaust gas in an accurate manner (for example, in an air fuel ratio sensor, it becomes possible to detect the air fuel ratio of the exhaust gas, and in an NOx sensor, it becomes possible to detect NOx in the exhaust gas). In that case, it becomes possible to quickly carry out air fuel ratio feedback control using a sensor output after the starting of the internal combustion engine.

However, when the exhaust gas sensor generates electric current from immediately after the starting of the internal combustion engine, even if the output value of the sensor circuit is learned immediately after the starting of the internal combustion engine, the learning value can become a value on which the electric current outputted by the exhaust gas sensor is reflected. Accordingly, it becomes difficult to grasp the output error of the sensor circuit itself, by eliminating the influence of the electric current which can be generated by the exhaust gas sensor.

Then, the control apparatus for an internal combustion engine according to the present disclosure is provided with a controller configured to control the temperature of said sensor element by using said heater, and controls the temperature of said sensor element to less than said predetermined temperature until the learning of the output value of said sensor circuit by said controller is completed after said starting processing is carried out by said controller.

Here, the predetermined temperature is a temperature at which electric current can be generated in the sensor element. Accordingly, in cases where the temperature of the sensor element is less than the predetermined temperature, electric current does not flow in the sensor element, so the exhaust gas sensor does not generate electric current. In other words, in the state where the temperature of the sensor element is controlled to less than the predetermined temperature, the influence of the electric current which can be generated by the exhaust gas sensor will be eliminated from the output value of the sensor circuit.

Said controller controls the temperature of the sensor element to less than the predetermined temperature until the learning of the output value of the sensor circuit is completed after the starting processing is carried out. For that reason, the controller can carry out the learning of the output value of the sensor circuit, in the state where the temperature of the sensor element is controlled to less than the predetermined temperature, while eliminating the influence of the electric current which can be generated by the exhaust gas sensor. In other words, according to the control apparatus for an internal combustion engine according to the present disclosure, an opportunity for learning the output value of the sensor circuit at the time of starting of the internal combustion engine can be obtained in an appropriate manner.

Here, said controller may control an energization duty ratio with respect to said heater to equal to or less than a predetermined ratio until the learning of the output value of said sensor circuit by said controller is completed after said starting processing is carried out by said controller. Here, the predetermined ratio is an energization duty ratio at which the temperature of the sensor element is able to be controlled to less than the predetermined temperature. In that case, the temperature of the sensor element can be controlled to less than the predetermined temperature, while promoting the warming up of the exhaust gas sensor. With this, too, the opportunity for learning the output value of the sensor circuit at the time of starting of the internal combustion engine can be obtained in an appropriate manner.

Further, in this case, said controller may control the energization duty ratio with respect to said heater to zero until the learning of the output value of said sensor circuit by said controller is completed after said starting processing is carried out by said controller. According to this, too, the opportunity for learning the output value of the sensor circuit at the time of starting of the internal combustion engine can be obtained in an appropriate manner.

Advantageous Effects

According to the present disclosure, it is possible to obtain an opportunity for learning an output value of a sensor circuit at the time of starting of an internal combustion engine in an appropriate manner.

DESCRIPTION OF THE EMBODIMENTS

Hereinafter, modes (or embodiments) for carrying out the present disclosure will be described in detail by way of example with reference to the attached drawings. However, the dimensions, materials, shapes, relative arrangements and so on of component parts described in the embodiments are not intended to limit the scope of the present disclosure to these alone in particular as long as there are no specific statements.

First Embodiment

<Construction of Intake and Exhaust Systems of Internal Combustion Engine>

Figure 1:
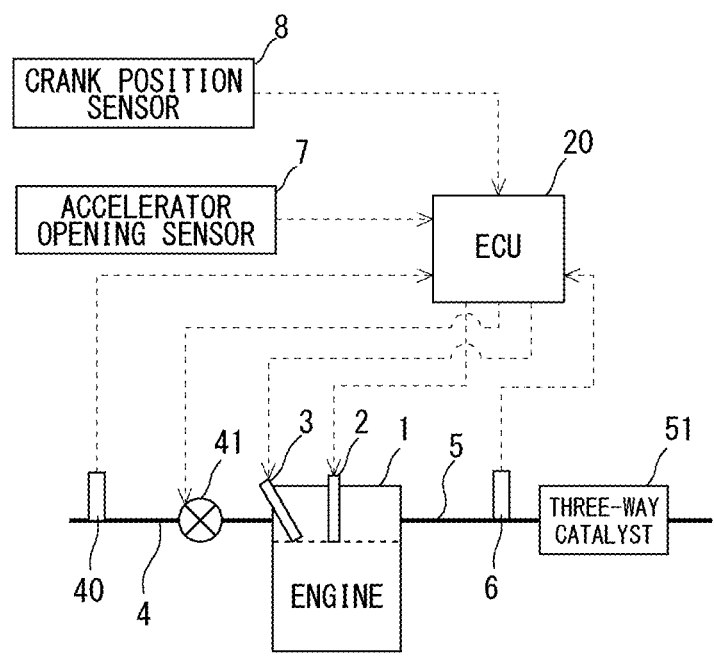
FIG. 1 is a view showing the schematic construction of an intake system and an exhaust system of an internal combustion engine according to a first embodiment of the present disclosure.

Hereinafter, a first embodiment of the present disclosure will be explained by using the attached drawings. FIG. 1 is a view showing the schematic construction of an internal combustion engine and its intake and exhaust systems according to this first embodiment of the present disclosure. The internal combustion engine, which is shown in FIG. 1 and denoted by 1, is an internal combustion engine of spark ignition type using gasoline, etc., as fuel, and is provided with a spark plug 2 and a fuel injection valve 3.

The internal combustion engine 1 is connected to an intake passage 4. In the intake passage 4, there are arranged an air flow meter 40 and a throttle valve 41. The air flow meter 40 outputs an electrical signal corresponding to an amount (mass) of intake air (air) flowing in the intake passage 4. The throttle valve 41 is arranged in the intake passage 4 at the downstream side of the air flow meter 40. The throttle valve 41 serves to adjust an amount of intake air in the internal combustion engine 1 by changing the channel cross section of the intake passage 4.

The internal combustion engine 1 is connected to an exhaust passage 5. A three-way catalyst 51 is arranged in the exhaust passage 5. In addition, an air fuel ratio sensor 6 for detecting the air fuel ratio of exhaust gas flowing into the three-way catalyst 51 is arranged in the exhaust passage 5 at a location upstream of the three-way catalyst 51. This air fuel ratio sensor 6 is, for example, a limiting current type oxygen sensor, and generates electric current which is substantially proportional to the air fuel ratio over a wide air fuel ratio region. Here, note that the air fuel ratio sensor 6 is not limited to the limiting current type oxygen sensor, but may also be an electromotive force type (concentration cell type) oxygen sensor, for example. Here, note that in this embodiment, the air fuel ratio sensor 6 corresponds to an exhaust gas sensor in the present disclosure.

Then, an electronic control unit (ECU) 20 is provided in combination with the internal combustion engine 1. This ECU 20 is a unit that controls an operating state of the internal combustion engine 1, etc. A variety of kinds of sensors such as an accelerator opening sensor 7, a crank position sensor 8, etc., in addition to the air flow meter 40 and the air fuel ratio sensor 6 mentioned above, are electrically connected to the ECU 20. The accelerator opening sensor 7 is a sensor which outputs an electrical signal correlated with an amount of operation (accelerator opening) of an unillustrated accelerator pedal. The crank position sensor 8 is a sensor which outputs an electrical signal correlated with a rotational position of an engine output shaft (crankshaft) of the internal combustion engine 1. Then, the output signals of these sensors are inputted to the ECU 20. The ECU 20 derives an engine load of the internal combustion engine 1 based on the output signal of the accelerator opening sensor 7, and also derives an engine rotational speed of the internal combustion engine 1 based on the output signal of the crank position sensor 8.

In addition, a variety of kinds of devices such as the spark plug 2, the fuel injection valve 3, the throttle valve 41 and so on are electrically connected to the ECU 20. Thus, these variety of kinds of devices are controlled by the ECU 20. For example, the ECU 20 detects the air fuel ratio of the exhaust gas flowing into the three-way catalyst 51 from the output signal of the air fuel ratio sensor 6, and controls the amount of fuel injected from the fuel injection valve 3 so that the air fuel ratio of the exhaust gas flowing into the three-way catalyst 51 is made to a target air fuel ratio (e.g., a stoichiometric air fuel ratio).

<Structure of the Air Fuel Ratio Sensor>

Figure 2:
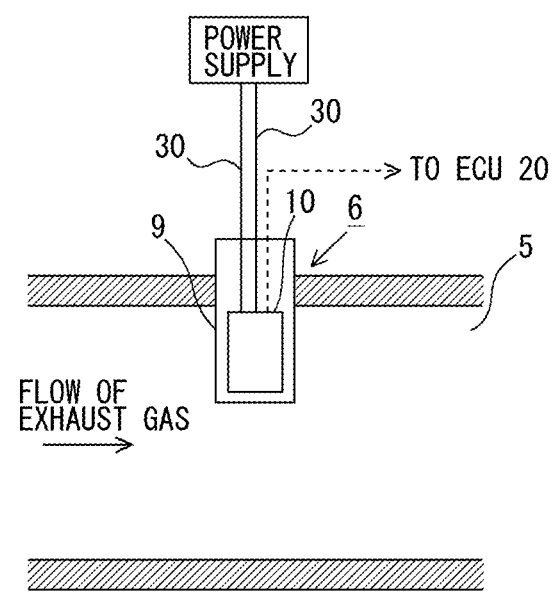
FIG. 2 is an enlarged schematic cross sectional view in the vicinity of an air fuel ratio sensor in FIG. 1.
Figure 3:
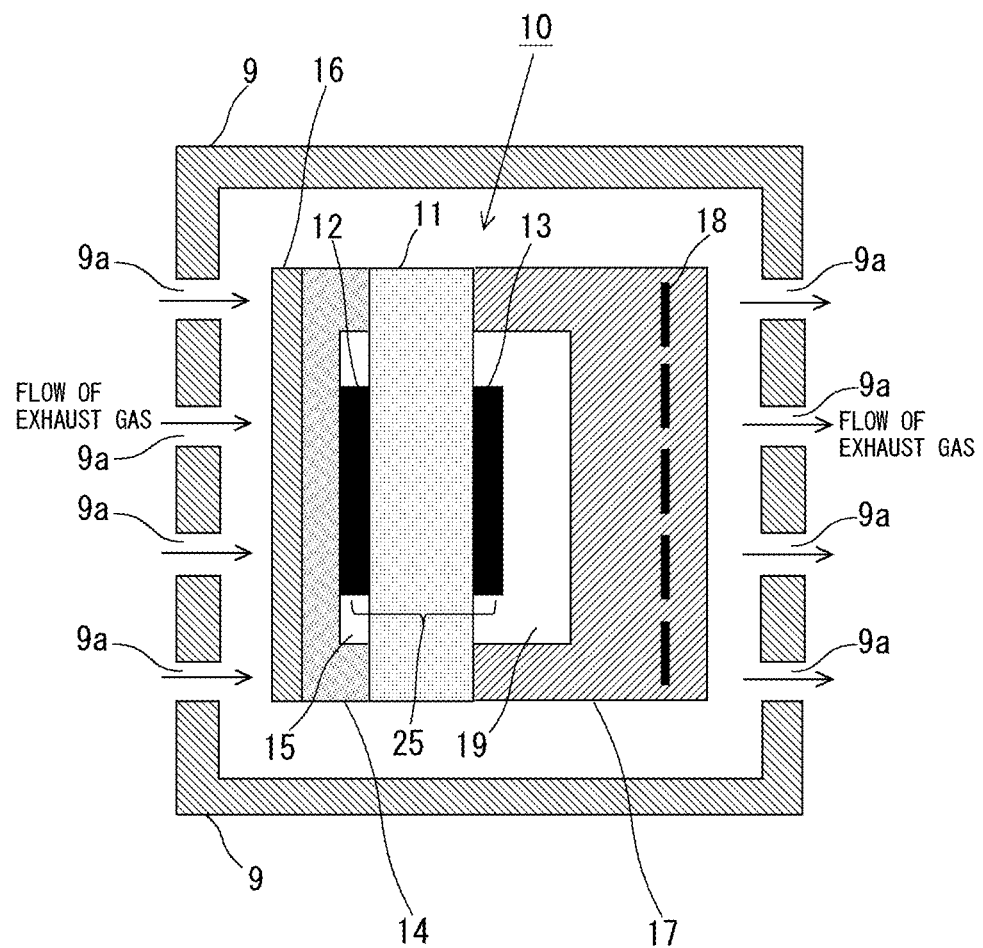
FIG. 3 is a vertical cross sectional view in the vicinity of a tip end of the air fuel ratio sensor.

Next, the structure of the air fuel ratio sensor 6 will be briefly explained based on FIG. 2 and FIG. 3. FIG. 2 is an enlarged schematic cross sectional view in the vicinity of the air fuel ratio sensor 6 in FIG. 1. Also, FIG. 3 is a longitudinal cross sectional view in the vicinity of a tip end of the air fuel ratio sensor 6.

In FIG. 2, the air fuel ratio sensor 6 is composed of a sensor body 10 to be described later, and a protective cover 9 which is a heat-resistant housing member covering the sensor body 10, with a part thereof being exposed to the exhaust passage 5. The sensor body 10 is covered with the protective cover 9, so that its mechanical strength is ensured.

In addition, a sensor circuit 30 is connected to the sensor body 10. The sensor circuit 30 is further connected to a power supply so as to apply a predetermined voltage between an exhaust gas side electrode 12 and an atmosphere side electrode 13 which will be described later.

Now, the schematic construction of the sensor body 10 will be explained based on FIG. 3. The sensor body 10 is provided with a solid electrolyte 11. When the solid electrolyte 11 becomes equal to or higher than a predetermined temperature (e.g., 250 degrees C.), it will exhibit oxygen ion conductivity. Such a solid electrolyte 11 is composed of zirconium oxide (zirconia), for example. Here, note that the predetermined temperature is hereinafter referred to as an "oxygen ion conduction temperature". Then, the solid electrolyte 11 is formed on one side surface thereof with the exhaust gas side electrode 12, and on the other side surface thereof with the atmosphere side electrode 13. These exhaust gas side electrode 12 and atmosphere side electrode 13 are each composed of a metallic material of high catalytic activity, such as platinum. Thus, the exhaust gas side electrode 12 and the atmosphere side electrode 13 are formed in this manner, whereby the solid electrolyte 11 is sandwiched by the pair of electrodes. Here, note that in this embodiment, the exhaust gas side electrode 12, the atmosphere side electrode 13, and the solid electrolyte 11 together constitute a sensor element in the present disclosure.

Then, a diffusion rate controlling layer 14 is laminated on one side surface of the exhaust gas side electrode 12 opposite to its side surface near the solid electrolyte 11. This diffusion rate controlling layer 14 is laminated so as to cover the exhaust gas side electrode 12 and one side of the solid electrolyte 11 on which the exhaust gas side electrode 12 is formed. The diffusion rate controlling layer 14 is a member which is composed of a porous material such as ceramics, etc., and which has a function to control the rate or speed of diffusion of the exhaust gas. That is, the diffusion rate controlling layer 14 is fine pored or densified to such an extent that various components in the exhaust gas can diffuse in a suitable diffusion rate. Also, a protective layer 16 is laminated on one side surface of the diffusion rate controlling layer 14 opposite to its side surface near the solid electrolyte 11. Then, a gas chamber 15 is formed between the solid electrolyte 11 and the diffusion rate controlling layer 14. The exhaust gas is introduced into this gas chamber 15 through the diffusion rate controlling layer 14. Here, the exhaust gas side electrode 12 is arranged in the gas chamber 15, and hence, the exhaust gas side electrode 12 will be exposed to the exhaust gas through the diffusion rate controlling layer 14. Here, note that it is not necessarily required to form the gas chamber 15, but it may instead be constructed so that the diffusion rate controlling layer 14 is in direct contact with a surface of the exhaust gas side electrode 12.

Moreover, a heater layer 17 is laminated on the other side surface of the solid electrolyte 11. A heater 18 is embedded in the heater layer 17, and the heater 18 can be supplied with electric power from an unillustrated outside electric circuit, so that it can heat the sensor body 10 to a desired activation temperature (e.g., 700 degrees C.). Here, note that this electric circuit is electrically connected to the ECU 20, so that the electric power supplied to the heater 18 is controlled by the ECU 20.

Then, an atmospheric chamber 19 is formed between the solid electrolyte 11 and the heater layer 17. The atmospheric chamber 19 is placed in communication with the atmosphere through unillustrated atmospheric holes, so that even in a state where the air fuel ratio sensor 6 is arranged in the exhaust passage 5, the atmosphere side electrode 13 is maintained in a state exposed to the atmosphere.

Here, the principle of detecting the air fuel ratio of the exhaust gas by means of the air fuel ratio sensor 6 will be explained. The exhaust gas introduced into the interior of the protective cover 9 through vent holes 9a, which are formed in the surface of the protective cover 9 so as to make the inside and outside of the protective cover 9 in fluid communication with each other, flows into the diffusion rate controlling layer 14, and progresses, while diffusing, in the interior thereof toward the exhaust gas side electrode 12. In the exhaust gas, there are contained a reducing agent such as CO, HC, etc., and an oxidizing agent such as $O_2$, NOx, etc. These components (the reducing agent and the oxidizing agent) react with each other until they arrive at an equilibrium state in a process of reaching the surface of the exhaust gas side electrode 12, or after reaching the exhaust gas side electrode 12. Then, in cases where the air fuel ratio of the exhaust gas is the stoichiometric air fuel ratio, the oxidizing agent and the reducing agent both disappear. In contrast to this, in cases where the air fuel ratio of the exhaust gas is richer than the stoichiometric air fuel ratio, the reducing agent will remain, whereas in cases where the air fuel ratio of the exhaust gas is leaner than the stoichiometric air fuel ratio, the oxidizing agent will remain.

Here, a region comprising the exhaust gas side electrode 12, the atmosphere side electrode 13 and the solid electrolyte 11 sandwiched by them is referred to as a "cell 25". In this embodiment, a predetermined application voltage is applied between the exhaust gas side electrode 12 and the atmosphere side electrode 13 through the sensor circuit 30. In cases where the oxidizing agent remains in the exhaust gas having reached the surface of the exhaust gas side electrode 12 in a state where the application voltage is applied between the electrodes (i.e., in cases where the air fuel ratio of the exhaust gas is leaner than the stoichiometric air fuel ratio), oxygen in the exhaust gas becomes oxygen ions and propagates from the exhaust gas side electrode 12 to the atmosphere side electrode 13 through the solid electrolyte 11, whereby electric current flows in the cell 25. On the other hand, in cases where the reducing agent remains at the side of the exhaust gas side electrode 12 (i.e., in cases where the air fuel ratio of the exhaust gas is richer than the stoichiometric air fuel ratio), oxygen in the exhaust gas becomes oxygen ions, propagates from the atmosphere side electrode 13 to the exhaust gas side electrode 12 through the solid electrolyte 11, and reacts with the reducing agent, whereby electric current in a direction opposite to the above direction flows in the cell 25. Here, note that in cases where the air fuel ratio of the exhaust gas is the stoichiometric air fuel ratio, oxygen ions do not propagate, in principle, between the electrodes through the solid electrolyte 11, so electric current does not flow in the cell 25.

Then, when the diffusion rate of the exhaust gas is controlled by the diffusion rate controlling layer 14, even if the application voltage is increased, a region occurs where the value of electric current (or current value) is saturated to a fixed value. This current value is referred to as a limiting current value. Here, in cases where the air fuel ratio of the exhaust gas is leaner than the stoichiometric air fuel ratio, the diffusion of the oxidizing agent to the exhaust gas side electrode 12 is controlled by the diffusion rate controlling layer 14, so the electric current is saturated to the limiting current value, whereas in cases where the air fuel ratio of the exhaust gas is richer than the stoichiometric air fuel ratio, the diffusion of the reducing agent to the exhaust gas side electrode 12 is controlled by the diffusion rate controlling layer 14, so the electric current is saturated to the limiting current value. Thus, by detecting the electric current, the air fuel ratio of the exhaust gas can be detected.

(Zero Point Learning of the Air Fuel Ratio Sensor)

The sensor circuit 30 connected to the air fuel ratio sensor 6 as mentioned above detects the limiting current value, and produces an output which is substantially proportional to the air fuel ratio according to the limiting current value. Here, in the sensor circuit 30, an output error may occur due to an individual difference, a change over time, etc., of the circuit. Accordingly, in order to make the detection accuracy of the air fuel ratio sensor 6 as high as possible, it is necessary to correct such an output error of the sensor circuit 30.

Here, as mentioned above, in cases where the air fuel ratio of the exhaust gas is the stoichiometric air fuel ratio, electric current does not flow in the cell 25. On the other hand, in cases where the temperature of the solid electrolyte 11 is less than the oxygen ion conduction temperature, too, the solid electrolyte 11 does not exhibit oxygen ion conductivity, and so electric current does not flow in the cell 25. In other words, in these cases, the output current of the air fuel ratio sensor 6 becomes zero.

Further, in this embodiment, the amount fuel to be injected from the fuel injection valve 3 is controlled so that the air fuel ratio of the exhaust gas flowing into the three-way catalyst 51 is made to the stoichiometric air fuel ratio. Specifically, by carrying out air fuel ratio feedback control using the output signal of the air fuel ratio sensor 6, the ECU 20 controls the amount fuel to be injected from the fuel injection valve 3 so that the air fuel ratio of the exhaust gas flowing into the three-way catalyst 51 is made to the stoichiometric air fuel ratio. Accordingly, at this time, when an error is included in the output value of the sensor circuit 30, there is a fear that it may become difficult to control the air fuel ratio of the exhaust gas flowing into the three-way catalyst 51 to the stoichiometric air fuel ratio, thus deteriorating exhaust emissions.

Accordingly, in this embodiment, when processing to start the internal combustion engine 1 (hereinafter, sometimes also referred to as "starting processing") is carried out, learning of the output value of the sensor circuit 30 is performed. At this time, the air fuel ratio sensor 6 has a tendency of being in a cold state (in other words, has a tendency that electric current does not flow in the cell 25), and hence, if an output error is not involved in the sensor circuit 30, the output value of the sensor circuit 30 becomes zero. In other words, the above-mentioned learning of the output value of the sensor circuit 30, which will be carried out when the starting processing is carried out, is zero point learning of the air fuel ratio sensor 6. Then, when the output error of the sensor circuit 30 is corrected based on the learning value obtained by this zero point learning, the sensor detection accuracy at the time when the air fuel ratio of the exhaust gas is the stoichiometric air fuel ratio is made as high as possible, thereby suppressing exhaust emissions as much as possible. Here, note that the above-mentioned execution of the starting processing and the above-mentioned learning of the output value of the sensor circuit 30 are carried out by the ECU 20. In addition, the ECU 20 functions as a controller according to the present disclosure by carrying out the starting processing, and the ECU 20 also functions as a controller according to the present disclosure by performing the learning of the output value of the sensor circuit 30.

(Warming Up Control of the Air Fuel Ratio Sensor)

On the other hand, when the air fuel ratio sensor 6 is in a cold state at the time of starting of the internal combustion engine 1, and the warming up of the air fuel ratio sensor 6 is carried out by the heater 18. Specifically, as mentioned above, the heater 18 serves to electrically heat the sensor body 10 to the desired activation temperature (e.g., 700 degrees C.). Here, note that the electric power supplied to the heater 18 is controlled by the ECU 20.

Here, supposing that the temperature of the sensor body 10 is made to the activation temperature (e.g., 700 degrees C.) quickly after the starting processing of the internal combustion engine 1 by means of electric heating with the heater 18, the temperature of the solid electrolyte 11 tends to reach the oxygen ion conduction temperature (e.g., 250 degrees C.) immediately after the starting processing of the internal combustion engine 1. In other words, the air fuel ratio sensor 6 is made into a state where output current can be generated from the air fuel ratio sensor 6, immediately after the starting processing of the internal combustion engine 1. In that case, the output current from the air fuel ratio sensor 6 in addition to the output error of the sensor circuit 30 itself can be reflected on the learning value in the above-mentioned zero point learning of the air fuel ratio sensor 6. In other words, there is a fear that the zero point learning to learn the output error of the sensor circuit 30 itself may become erroneous learning. As a result, it becomes difficult to control the air fuel ratio of the exhaust gas flowing into the three-way catalyst 51 to the stoichiometric air fuel ratio, thus giving rise to a fear that exhaust emissions may deteriorate.

Accordingly, in this embodiment, the temperature of the sensor body 10 is controlled to less than the oxygen ion conduction temperature until the learning of the output value of the sensor circuit 30 by the ECU 20 is completed after the starting processing of the internal combustion engine 1 is carried out. Specifically, by controlling the energization duty ratio with respect to the heater 18 to equal to or less than a predetermined ratio, the ECU 20 controls the temperature of the sensor body 10 to less than the oxygen ion conduction temperature. Here, note that the ECU 20 functions as a controller according to the present disclosure by controlling the temperature of the sensor body 10 in the above-mentioned manner.

Figure 4:
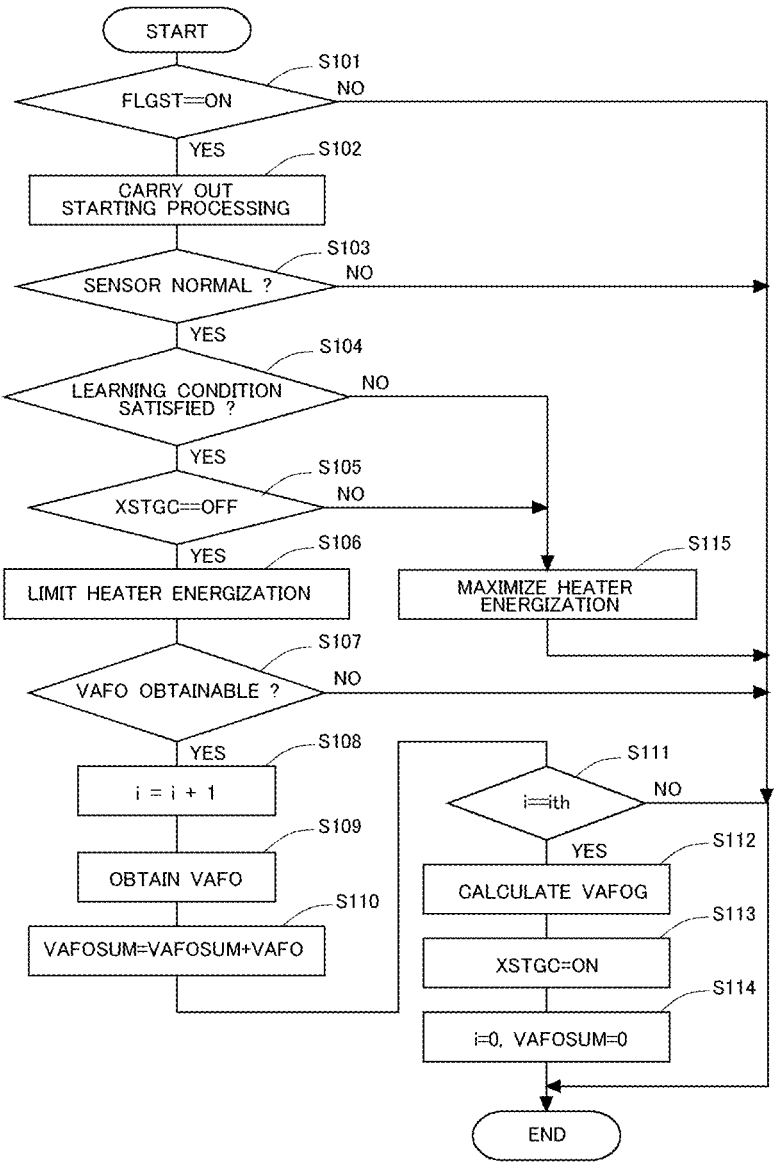
FIG. 4 is a flow chart showing a control flow according to the first embodiment of the present disclosure.

Here, a control flow or routine carried out by the ECU 20 will be explained based on FIG. 4. FIG. 4 is a flow chart showing the control flow or routine according to this embodiment. In this embodiment, this flow or routine is carried out at a predetermined operation interval in a repeated manner by the ECU 20.

In this routine, first in step S101, it is determined whether a starting request flag FLGST has been set to ON. The starting request flag FLGST is a flag which determines whether starting has been requested to the internal combustion engine 1, and which is set by well-known processing different from this routine. Then, in cases where an affirmative determination is made in step S101, i.e., in this case, when starting has been requested to the internal combustion engine 1, the routine of the ECU 20 goes to the processing of step S102. On the other hand, in cases where a negative determination is made in step S101, i.e., in this case, when starting has not been requested to the internal combustion engine 1, the execution of this routine is ended. Here, note that when the operating state of the internal combustion engine 1 becomes a predetermined starting completion state as a result of the starting request flag FLGST being set to ON thereby to carry out the starting processing to be described later, the starting request flag FLGST is set to OFF by means of processing different from this routine.

In cases where an affirmative determination is made in step S101, then in step S102, the starting processing is carried out. In step S102, for example, processing to set ignition to ON or processing to set the operation of a starter to ON is carried out as the starting processing. Here, note that in the course where this routine is repeatedly carried out, in cases where the processing of step S102 is again carried out after the execution of the starting processing is started at the first time in step S102, the ECU 20 continues the execution of the starting processing.

Subsequently, in step S103, it is determined whether the air fuel ratio sensor 6 is normal. In step S103, based on a well-known technique, it can be determined whether the air fuel ratio sensor 6 is normal. Then, in cases where an affirmative determination is made in step S103, the routine of the ECU 20 goes to the processing of step S104, whereas in cases where a negative determination is made in step S103, the execution of this routine is ended.

In cases where an affirmative determination is made in step S103, then in step S104, it is determined whether a learning condition for carrying out the learning of the output value of the sensor circuit 30 is satisfied. In step S104, for example, in cases where it is estimated that the temperature of the sensor body 10 is less than the oxygen ion conduction temperature, a determination is made that the learning condition is satisfied. Then, in cases where an affirmative determination is made in step S104, the routine of the ECU 20 goes to the processing of step S105, whereas in cases where a negative determination is made in step S104, the routine of the ECU 20 goes to the processing of step S115.

In cases where an affirmative determination is made in step S104, subsequently in step S105, it is determined whether a learning completion flag XSTGC has been set to OFF. The learning completion flag XSTGC is a flag which determines whether the above-mentioned zero point learning of the air fuel ratio sensor 6 has been completed, and which is set to ON when the zero point learning is completed, as will be described later. Here, note that the learning completion flag XSTGC is initialized to OFF, when the internal combustion engine 1 is stopped. Then, in cases where an affirmative determination is made in step S105, the routine of the ECU 20 goes to the processing of step S106, whereas in cases where a negative determination is made in step S105, the routine of the ECU 20 goes to the processing of step S115.

In cases where an affirmative determination is made in step S105, then in step S106, processing to limit electrical energization with respect to the heater 18 is carried out. In step S106, the energization duty ratio with respect to the heater 18 is limited to equal to or less than the predetermined ratio so that the temperature of the sensor body 10 is controlled to less than the oxygen ion conduction temperature. That is, the predetermined ratio is an energization duty ratio at which the temperature of the sensor element 10 is able to be controlled to less than the oxygen ion conduction temperature. This predetermined ratio is 20%, for example. With this, the temperature of the sensor element 10 can be controlled to less than the oxygen ion conduction temperature, while promoting the warming up of the exhaust gas sensor 6.

Thereafter, in step S107, it is determined whether the output value VAFO of the sensor circuit 30 is able to be obtained. In step S107, first, the predetermined application voltage is applied to the sensor circuit 30. Then, based on a well-known technique, it is determined whether the output value VAFO is able to be obtained. For example, when a variation in the voltage of the power supply connected to the sensor circuit 30 becomes large, there may occur a situation where the output value VAFO can not be read correctly. In addition, when the power supply voltage becomes low, its variation tends to become large. Accordingly, in step S107, in cases where the power supply voltage is equal to or more than 8V, for example, a determination can be made that the output value VAFO is able to be obtained. Then, in cases where an affirmative determination is made in step S107, the routine of the ECU 20 goes to the processing of step S108, whereas in cases where a negative determination is made in step S107, the execution of this routine is ended.

In cases where an affirmative determination is made in step S107, then in step S108, a counter i is added by 1. This counter i serves to count the frequency of obtaining the output value VAFO. Then, in step S109, the output value VAFO is obtained, and in step S110, the output value VAFO obtained in step S109 is integrated. Here, note that the output value VAFO is obtained in a state where the predetermined application voltage is applied to the sensor circuit 30. In addition, in step S110, an integrated value VAFOSUM of the output value VAFO is calculated by the following equation 1.

$$VAFOSUM=VAFOSUM+VAFO \quad \text{Expression 1}$$

VAFO: the output value
VAFOSUM: the integrated value of the output value VAFO

Subsequently, in step S111, it is determined whether the value of the counter i has reached a prescribed frequency ith. Here, the prescribed frequency ith is a frequency of integration of the output value VAFO necessary for calculating the learning value in the processing of step S112 to be described later, and ith is, for example, 100. Then, in cases where an affirmative determination is made in step S111, the routine of the ECU 20 goes to the processing of step S112, whereas in cases where a negative determination is made in step S111, the execution of this routine is ended.

In cases where an affirmative determination is made in step S111, then in step S112, the zero point learning value VAFOG of the air fuel ratio sensor 6 is calculated. In step S112, first, an average value (output average value) VAFOAVE of the output value VAFO obtained in step S109 is calculated by the following equation 2.

$$VAFOAVE=VAFOSUM/ith \quad \text{Expression 2}$$

VAFOAVE: the output average
VAFOSUM: the integrated value of the output value VAFO
ith: the prescribed frequency (e.g., 100)

Then, the zero point learning value VAFOG is calculated based on the output average value VAFOAVE thus calculated. The zero point learning value VAFOG thus calculated is stored in a RAM of the ECU 20 as a zero point of the sensor output.

Subsequently, in step S113, the learning completion flag XSTGC is set to ON. Then, in step S114, the value of the counter i and the integrated value VAFOSUM of the output value VAFO are both initialized to zero. Then, after the processing of step S114, the execution of this routine is ended.

In addition, in cases where a negative determination is made in step S104 or S105, then in step S115, processing to maximize electrical energization with respect to the heater 18 is carried out. In step S115, the energization duty ratio with respect to the heater 18 is controlled to 100%. With this, after the zero point learning of the sensor output, the air fuel ratio sensor 6 can be warmed up as quickly as possible. Then, after the processing of step S115, the execution of this routine is ended.

Figure 5:
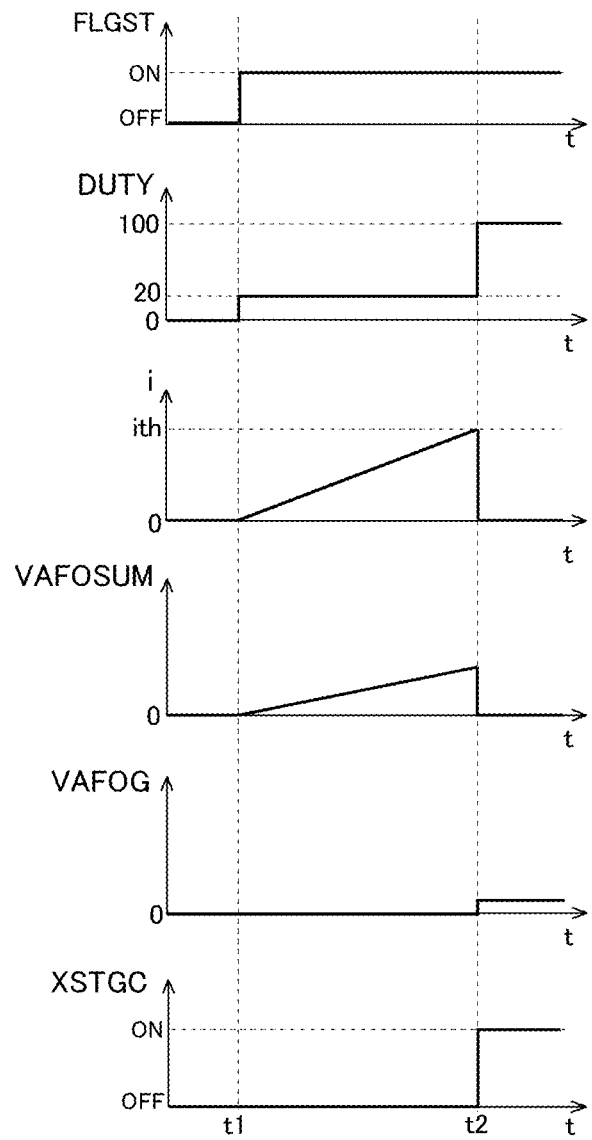
FIG. 5 is a time chart showing the changes over time of a starting request flag, an energization duty ratio, a counter, an output integrated value, a zero point learning value, and a learning completion flag according to the first embodiment of the present disclosure.

Here, the above-mentioned control flow or routine will be briefly explained with the use of a time chart shown in FIG. 5. FIG. 5 is the time chart showing the changes over time of the starting request flag FLGST, the energization duty ratio DUTY with respect to the heater 18, the counter i, the output integrated value VAFOSUM of the sensor circuit 30, the zero point learning value VAFOG, and the learning completion flag XSTGC.

As shown in FIG. 5, until a time point t1, the energization duty ratio has been made to 0%, and electrical energization is not carried out to the heater 18. Then, when the starting request flag FLGST is set to ON at the time point t1, the energization duty ratio is controlled to 20%. In other words, the electric heating of the sensor body 10 is carried out in a state where the electrical energization with respect to the heater 18 is limited, as described in the explanation of the above-mentioned processing of step S106 in FIG. 4.

In addition, at the time point t1 at which the starting request flag FLGST is set to ON, the counting of the frequency of obtaining the output value VAFO is started (this being represented by the change over time of the counter in FIG. 5), and at the same time, the output value VAFO is integrated (this being represented by the change over time of the output integrated value in FIG. 5).

Then, when the value of the counter reaches the prescribed frequency ith at a time point t2, the zero point learning value VAFOG is calculated, and the learning completion flag XSTGC is set to ON. In addition, the counter and the output integrated value are both initialized to 0.

Further, after the learning completion flag XSTGC is set to ON, the energization duty ratio is controlled to 100%, so that quick warming up of the air fuel ratio sensor 6 is attained.

According to the zero point learning of the air fuel ratio sensor 6 as explained above, the learning of the output value of the sensor circuit 30 can be carried out, while eliminating the influence of the output current which may be generated by the air fuel ratio sensor 6. Stated in another way, the ECU 20 controls the energization duty ratio with respect to the heater 18 to equal to or less than the predetermined ratio so that the temperature of the sensor body 10 becomes lower than the oxygen ion conduction temperature until the learning of the output value of the sensor circuit 30 is completed after the starting processing is carried out, thereby making it possible to ensure an opportunity for learning the output value of the sensor circuit 30 at the time of starting of the internal combustion engine 1 in an appropriate manner.

Here, note that in this embodiment, an explanation has been made using the air fuel ratio sensor 6 as an example, but the present disclosure can be applied to other sensors each having a heater. For example, even in cases where a heater is controlled in a PM sensor, an NOx sensor, or an HC sensor, too, the present disclosure can be applied, as in this embodiment.

Second Embodiment

Next, reference will be made to a second embodiment of the present disclosure. Here, note that in this second embodiment, the detailed explanation of substantially the same construction as in the above-mentioned first embodiment will be omitted.

In the above-mentioned first embodiment, the energization duty ratio with respect to the heater 18 is controlled to equal to or less than the predetermined ratio until the learning of the output value of the sensor circuit 30 is completed after the starting processing is carried out. On the other hand, in this second embodiment, the energization duty ratio with respect to the heater 18 is controlled to 0 until the learning of the output value of the sensor circuit 30 is completed after the starting processing is carried out.

Figure 6:
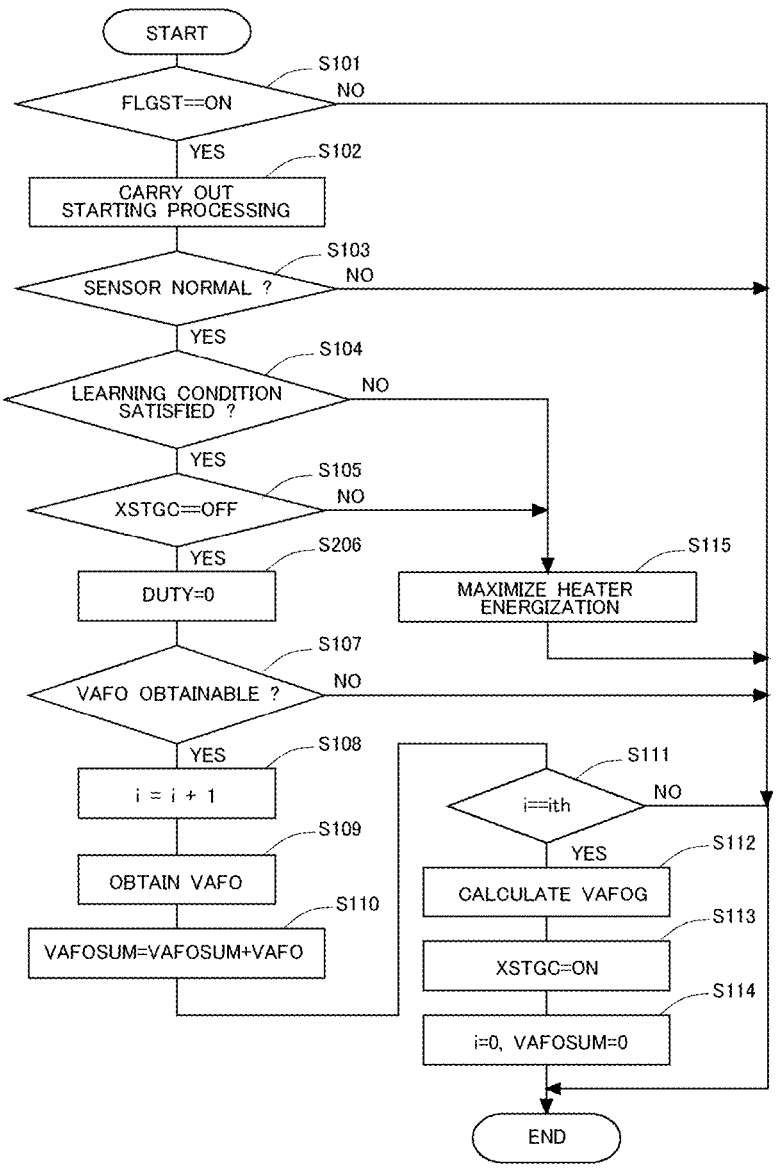
FIG. 6 is a flow chart showing a control flow according to a second embodiment of the present disclosure.

Here, a control flow or routine carried out by the ECU 20 will be explained based on FIG. 6. FIG. 6 is a flow chart showing the control flow or routine according to this second embodiment. In this second embodiment, this flow or routine is carried out at a predetermined operation interval in a repeated manner by the ECU 20. Here, note that in respective processings shown in FIG. 6, the same reference signs are attached to the substantially same processings as those shown in the above-mentioned FIG. 4, and the detailed explanation thereof is omitted.

In the control routine shown in FIG. 6, in cases where an affirmative determination is made in step S105, then in step S206, the energization duty ratio DUTY with respect to the heater 18 is controlled to 0. With this, the temperature of the sensor element 10 can be controlled to less than the oxygen ion conduction temperature in a reliable manner. Then, the processing of step S107 is carried out after the processing of step S206.

Figure 7:
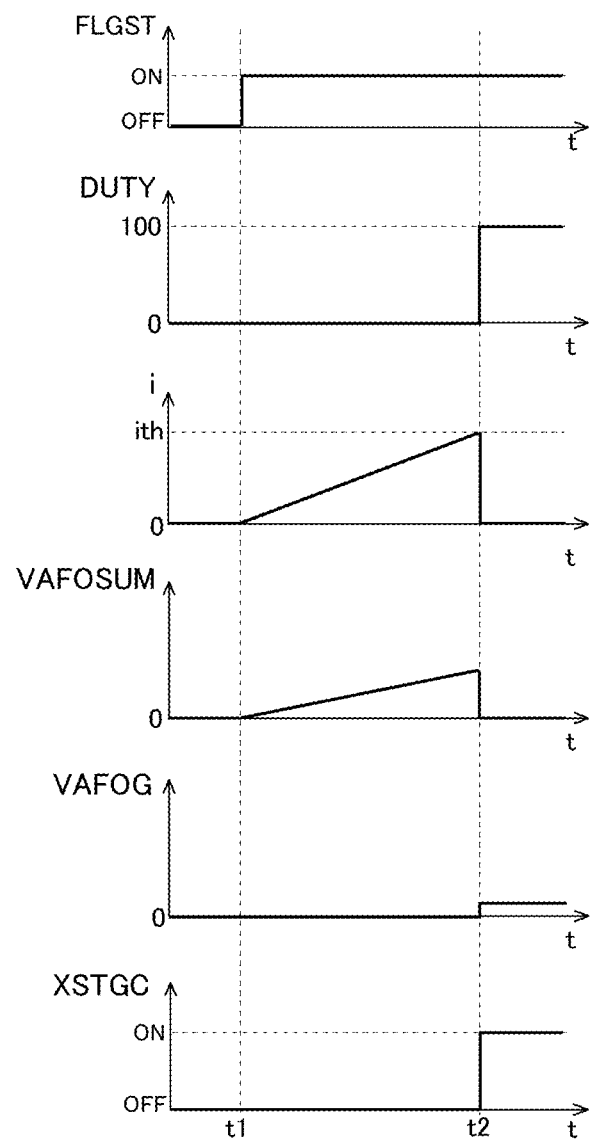
FIG. 7 is a time chart showing the changes over time of a starting request flag, an energization duty ratio, a counter, an output integrated value, a zero point learning value, and a learning completion flag according to the second embodiment of the present disclosure.

In addition, FIG. 7 is a time chart showing the changes over time of the starting request flag FLGST, the energization duty ratio DUTY with respect to the heater 18, the counter i, the output integrated value VAFOSUM of the sensor circuit 30, the zero point learning value VAFOG, and the learning completion flag XSTGC, in this second embodiment. Here, note that the time chart shown in FIG. 7 is different from the above-mentioned time chart shown in FIG. 5 only in the change over time of the energization duty ratio DUTY.

As shown in FIG. 7, the energization duty ratio DUTY is made to 0% until the time point t1. This is the same as in the above-mentioned time chart shown in FIG. 5. However, in this second embodiment, even though the starting request flag FLGST is set to ON at the time point t1, the energization duty ratio DUTY is controlled to 0% as it is. Then, after the learning completion flag XSTGC is set to ON at the time point t2, the energization duty ratio DUTY is controlled to 100%.

According to the control processing explained above, too, the opportunity for learning the output value of the sensor circuit 30 at the time of starting of the internal combustion engine 1 can be obtained in an appropriate manner.

The invention claimed is:

1. A control apparatus for an internal combustion engine comprising:
   an exhaust gas sensor, the exhaust gas sensor comprising:
      a sensor element arranged in an exhaust passage of the internal combustion engine, the sensor element including a material that generates an electric current when a temperature of the material included in the sensor element is equal to or higher than a predetermined temperature, and generates no electric current when the temperature of the material is less than the predetermined temperature;
      a first electrode on a first side of the sensor element;
      a second electrode on a second side of the sensor element opposite the first side of the sensor element; and
      a heater for electrically heating the sensor element;
   a power supply;
   a sensor circuit electrically connected to the power supply and the exhaust gas sensor, the sensor circuit configured to:
      apply a predetermined voltage between the first electrode and the second electrode;
      detect the electric current generated by the sensor element; and
      produce an output value, the output value being one of (1) a first value proportional to an air-fuel ratio of an exhaust gas in the exhaust passage based on the electric current when the temperature of the sensor element is at least the predetermined temperature and an output error of the sensor circuit is zero, (2) a second value indicative of the output error of the sensor circuit when the output error of the sensor circuit is greater than zero and the sensor element generates no electric current, or (3) a third value that is equal to zero when the output error of the sensor circuit is zero and the sensor element generates no electric current; and
   a controller configured to:
      carry out starting processing to start the internal combustion engine, the starting processing comprising a time period during which the temperature of the sensor element is less than the predetermined temperature;
      control the heater during the time period of the starting processing during which the temperature of the sensor element is less than the predetermined temperature to increase the temperature of the sensor element from a first temperature less than the predetermined temperature to a second temperature less than the predetermined temperature, and to delay the heater from causing the temperature of the sensor element to reach the predetermined temperature until all of a predefined quantity of output values of the sensor circuit are obtained while the temperature of the sensor element is less than the predetermined temperature;
      calculate an average of the predefined quantity of output values of the sensor circuit obtained during the time period of the starting processing during which the temperature of the sensor element is less than the predetermined temperature;
      calculate a zero point learning value of the exhaust gas sensor based on the average of the predefined quantity of output values of the sensor circuit calculated; and
      correct the output error of the sensor circuit by using the zero point learning value of the exhaust gas sensor calculated as a zero point of the sensor circuit.

2. The control apparatus as set forth in claim 1, wherein the controller is configured to control the heater to delay the heater from causing the temperature of the sensor element to reach the predetermined temperature until all of the predefined quantity of output values of the sensor circuit are obtained by causing an energization duty ratio with respect to the heater to be less than a maximum energization duty ratio with respect to the heater.

3. The control apparatus as set forth in claim 2, wherein until all of the predefined quantity of output values of the sensor circuit are obtained, the controller causes the energization duty ratio with respect to the heater to be 20%.

* * * * *